US012625893B2

(12) United States Patent
Guo et al.

(10) Patent No.: US 12,625,893 B2
(45) Date of Patent: May 12, 2026

(54) HARDWARE ACCELERATION DEVICE FOR STRING MATCHING AND RANGE COMPARISON

(71) Applicant: Fortinet, Inc., Sunnyvale, CA (US)

(72) Inventors: Zhi Guo, San Jose, CA (US); Xu Zhou, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 1142 days.

(21) Appl. No.: 16/572,394

(22) Filed: Sep. 16, 2019

(65) Prior Publication Data

US 2021/0084011 A1 Mar. 18, 2021

(51) Int. Cl.
| | |
|---|---|
| *G06F 16/334* | (2025.01) |
| *G06F 16/22* | (2019.01) |
| *G06F 16/2455* | (2019.01) |
| *G06F 16/903* | (2019.01) |
| *H04L 9/40* | (2022.01) |
| *H04L 41/0894* | (2022.01) |

(52) U.S. Cl.
CPC ........ *G06F 16/334* (2019.01); *G06F 16/2255* (2019.01); *G06F 16/24568* (2019.01); *G06F 16/90344* (2019.01); *H04L 41/0894* (2022.05); *H04L 63/0263* (2013.01)

(58) Field of Classification Search
None
See application file for complete search history.

(56) References Cited

U.S. PATENT DOCUMENTS

| | | | | |
|---|---|---|---|---|
| 7,941,605 | B1 * | 5/2011 | Oren ...................... | H04L 69/22 |
| | | | | 707/E17.037 |
| 8,176,545 | B1 * | 5/2012 | Greenfield ............ | H04L 63/164 |
| | | | | 726/13 |
| 8,850,060 | B1 * | 9/2014 | Beloussov .......... | H04L 63/1408 |
| | | | | 718/1 |
| 9,641,555 | B1 * | 5/2017 | Brisebois ............ | G06F 21/6245 |

(Continued)

OTHER PUBLICATIONS

Wikipedia, "Bloom filter", downloaded from the Internet on May 2, 2022, dated 2016, pp. 1-14, using URL: http://web.archive.org/web/20160201194147/https://en.wikipedia.org/wiki/Bloom_filter (Year: 2016).*

(Continued)

*Primary Examiner* — Bassam A Noaman

(74) *Attorney, Agent, or Firm* — Jaffery Watson Hamilton & DeSanctis LLP

(57) ABSTRACT

Systems and methods are described for providing effective hardware acceleration by performing a combination of string matching and range comparison. According to one embodiment, acceleration device of a host device associated with datacenter receives an input stream of information. The received information is matched with contents of a hash-based lookup table to identify one or more units, which satisfy at least one condition for any or a combination of a string match and a range comparison. The identified one or more units are correlated based on a set of conditions, which define at least one rule related to any of a network policy definition, a packet inspection rule, a database operation command or a format of the input stream. Any or a combination of exact string matching and exact range matching is then performed based on the at least one set of correlated units.

20 Claims, 9 Drawing Sheets

700

RECEIVING, BY AN ACCELERATION DEVICE OF A HOST DEVICE ASSOCIATED WITH A DATA CENTER, AN INPUT STREAM OF INFORMATION, SAID INPUT STREAM COMPRISING ANY OR A COMBINATION OF A STRING OR AN INTEGER RANGE —702

MATCHING, BY THE ACCELERATION DEVICE, THE INPUT STREAM OR PARTS THEREOF WITH CONTENTS OF A HASH BASED LOOKUP TABLE TO IDENTIFY ONE OR MORE UNITS OF THE INPUT STREAM, WHICH SATISFY AT LEAST ONE CONDITION OF THE PLURALITY OF CONDITIONS FOR ANY OR A COMBINATION OF A STRING MATCH AND A RANGE COMPARISON —704

CORRELATING, BY THE ACCELERATION DEVICE, THE ONE OR MORE IDENTIFIED UNITS BASED ON A SET OF CONDITIONS SELECTED FROM THE PLURALITY OF CONDITIONS TO FORM AT LEAST ONE SET OF CORRELATED UNITS, WHEREIN THE SET OF CONDITIONS DEFINE AT LEAST ONE RULE RELATED TO ANY OF A NETWORK POLICY DEFINITION, A PACKET INSPECTION RULE, A DATABASE OPERATION COMMAND OR A FORMAT OF THE INPUT STREAM —706

PERFORMING, BY THE ACCELERATION DEVICE, ANY OR A COMBINATION OF EXACT STRING MATCHING AND EXACT RANGE MATCHING BASED ON THE AT LEAST ONE SET OF CORRELATED UNITS —708

(56)       References Cited

U.S. PATENT DOCUMENTS

| | | | |
|---|---|---|---|
| 10,778,721 B1 * | 9/2020 | Holbrook | H04L 63/20 |
| 10,990,887 B1 * | 4/2021 | Bray | G06N 5/027 |
| 11,005,950 B1 * | 5/2021 | Lambert | H04L 65/611 |
| 2013/0051300 A1 * | 2/2013 | He | H04W 4/06 |
| | | | 370/312 |
| 2014/0133233 A1 * | 5/2014 | Li | G11C 16/0483 |
| | | | 365/185.11 |
| 2015/0055481 A1 * | 2/2015 | Guo | H04L 63/0245 |
| | | | 370/238 |
| 2019/0044866 A1 * | 2/2019 | Chilikin | H04L 47/2408 |
| 2019/0379696 A1 * | 12/2019 | Ludwig | H04L 63/1433 |
| 2020/0177654 A1 * | 6/2020 | Mittal | H04L 65/611 |

OTHER PUBLICATIONS

Wikipedia, "Data Center", downloaded from the Internet on Sep. 23, 2022, dated Aug. 2019, pp. 1-21, using URL: https://en.wikipedia.org/w/index.php?title=Data_center&oldid=913301191 (Year: 2019).*

* cited by examiner

200

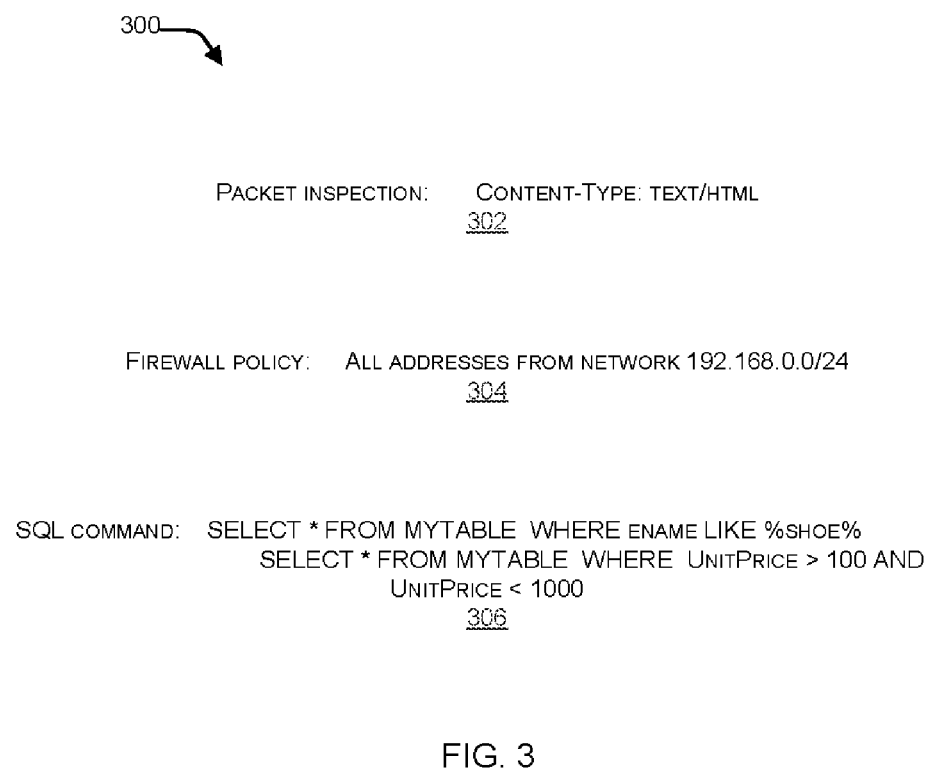

300

PACKET INSPECTION: CONTENT-TYPE: TEXT/HTML
302

FIREWALL POLICY: ALL ADDRESSES FROM NETWORK 192.168.0.0/24
304

SQL COMMAND: SELECT * FROM MYTABLE WHERE ENAME LIKE %SHOE%
SELECT * FROM MYTABLE WHERE UNITPRICE > 100 AND
UNITPRICE < 1000
306

FIG. 3

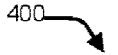
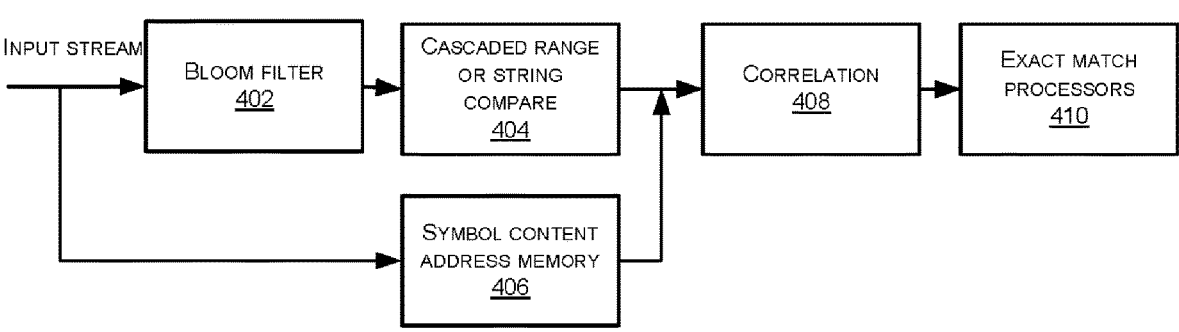
FIG. 4

600

650

| TYPE | CONTENT | OTHER ASSOCIATE DATA |
|------|---------|----------------------|
| STRING | ABCD | ........ |
| ..... | | |
| RANGE | {LOWER BOUNDARY,STRIDE} | .......... |
| ..... | | |

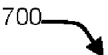

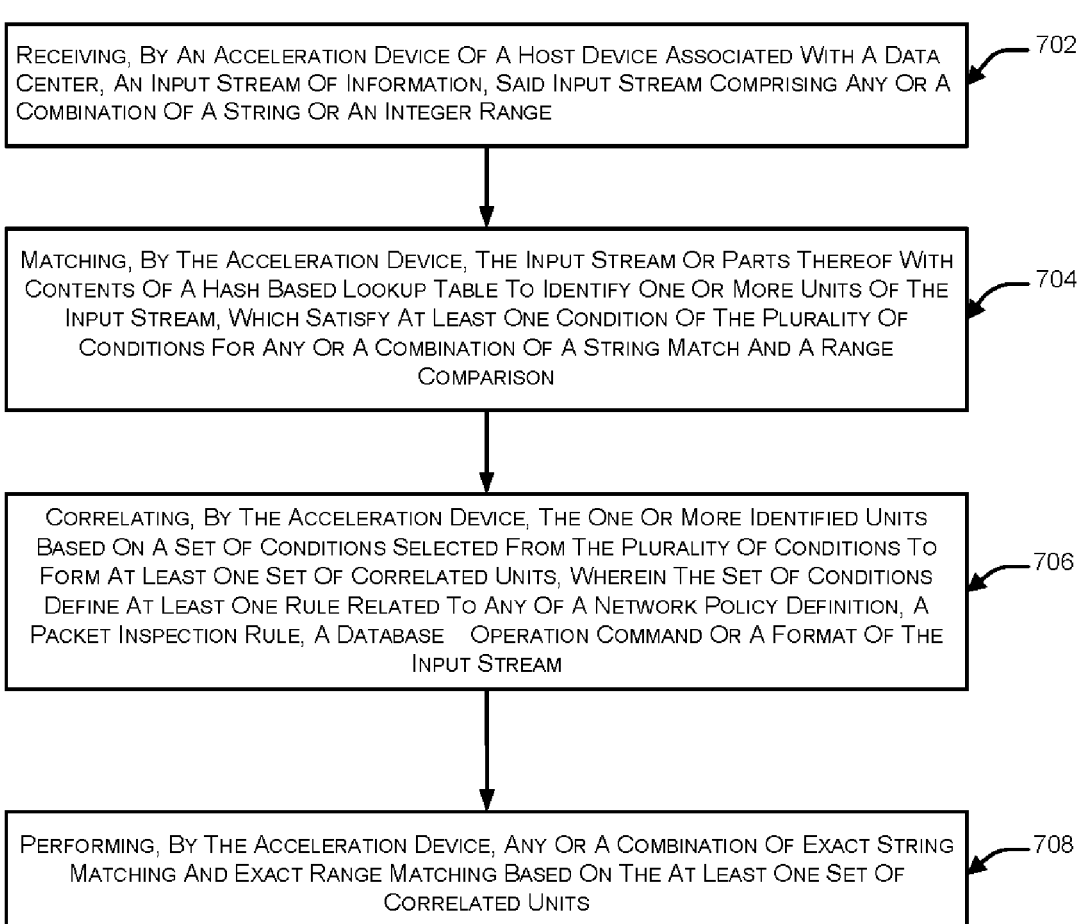

RECEIVING, BY AN ACCELERATION DEVICE OF A HOST DEVICE ASSOCIATED WITH A DATA CENTER, AN INPUT STREAM OF INFORMATION, SAID INPUT STREAM COMPRISING ANY OR A COMBINATION OF A STRING OR AN INTEGER RANGE ⟍702

MATCHING, BY THE ACCELERATION DEVICE, THE INPUT STREAM OR PARTS THEREOF WITH CONTENTS OF A HASH BASED LOOKUP TABLE TO IDENTIFY ONE OR MORE UNITS OF THE INPUT STREAM, WHICH SATISFY AT LEAST ONE CONDITION OF THE PLURALITY OF CONDITIONS FOR ANY OR A COMBINATION OF A STRING MATCH AND A RANGE COMPARISON ⟍704

CORRELATING, BY THE ACCELERATION DEVICE, THE ONE OR MORE IDENTIFIED UNITS BASED ON A SET OF CONDITIONS SELECTED FROM THE PLURALITY OF CONDITIONS TO FORM AT LEAST ONE SET OF CORRELATED UNITS, WHEREIN THE SET OF CONDITIONS DEFINE AT LEAST ONE RULE RELATED TO ANY OF A NETWORK POLICY DEFINITION, A PACKET INSPECTION RULE, A DATABASE  OPERATION COMMAND OR A FORMAT OF THE INPUT STREAM ⟍706

PERFORMING, BY THE ACCELERATION DEVICE, ANY OR A COMBINATION OF EXACT STRING MATCHING AND EXACT RANGE MATCHING BASED ON THE AT LEAST ONE SET OF CORRELATED UNITS ⟍708

HARDWARE ACCELERATION DEVICE FOR STRING MATCHING AND RANGE COMPARISON

COPYRIGHT NOTICE

BACKGROUND

Field

Embodiments of the present invention generally relate to network security and distributed computing. In particular, embodiments of the present invention relate to systems and methods that provide effective hardware acceleration by performing a combination of string matching and range comparison.

Description of the Related Art

High speed network technologies with complex architectures use pattern matching based on efficient and accurate string matching and range comparison techniques for various applications, such as information retrieval, virus scanning, DNA sequence analysis, data mining, machine learning, network security and pattern recognition. In network architectures, network policies are defined using a combination of integers, integer ranges, time, date, etc. Stand-alone firewall appliances and server-based firewall devices use pattern matching for comparing metadata of network packets (e.g. Internet Protocol (IP) addresses, ports, etc.) against a list of network policies with priority to implement network policy search.

As users of cloud computing services platforms and data centers are not typically directly charged for network security workload, it is desirable to free host CPU cores from time consuming tasks, such as network policy search. Additionally, in data centers many user applications, such as database applications, often involve heavy pattern matching, regular expression matching and range comparison techniques. Consequently, such heavy processes increase the computational burden on host systems and create dissatisfying user experience and/or heavy data streams to host processors.

When a need to perform certain computational functions more efficiently than a general-purpose CPU arises, a device known as a hardware accelerator may be employed. A hardware accelerator broadly refers to any hardware device that performs certain functions faster and more efficient than a general purpose processor by offloading computationally intense processing tasks that the processor would normally handle. These devices are implemented to decrease latency and increase throughput, thereby improving overall user experience; however, due to the fluctuation of workloads within servers of data centers, hardware accelerators, such as dedicated Peripheral Component Interconnect Express (PCIe)-based boards are not always cost effective.

SUMMARY

Systems and methods are described for providing effective hardware acceleration by performing a combination of string matching and range comparison. According to one embodiment, an acceleration device of a host device receives an input stream of information including a string and/or an integer range. The input stream or part of the input stream is matched with contents of a hash-based lookup table to identify one or more units of the input stream, which satisfy at least one condition for any or a combination of a string match and a range comparison. The identified one or more units of the input stream are correlated based on set of conditions to form at least one set of correlated units such that the set of conditions define at least one rule related to any of a network policy definition, a packet inspection rule, a database operation command or a format of the input stream. Further, based on the at least one set of correlated units, the acceleration device performs any or a combination of exact string matching and exact range match.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 3 illustrates examples of a packet inspection rule, a firewall policy and an SQL command for which pattern matching and range comparison hardware acceleration would be helpful.

FIG. 4 is a block diagram illustrating components of an acceleration device in accordance with an embodiment of the present invention.

FIG. 7 is a flow diagram illustrating a process for string and range matching in accordance with an embodiment of the present invention.

DETAILED DESCRIPTION

Figure 1:
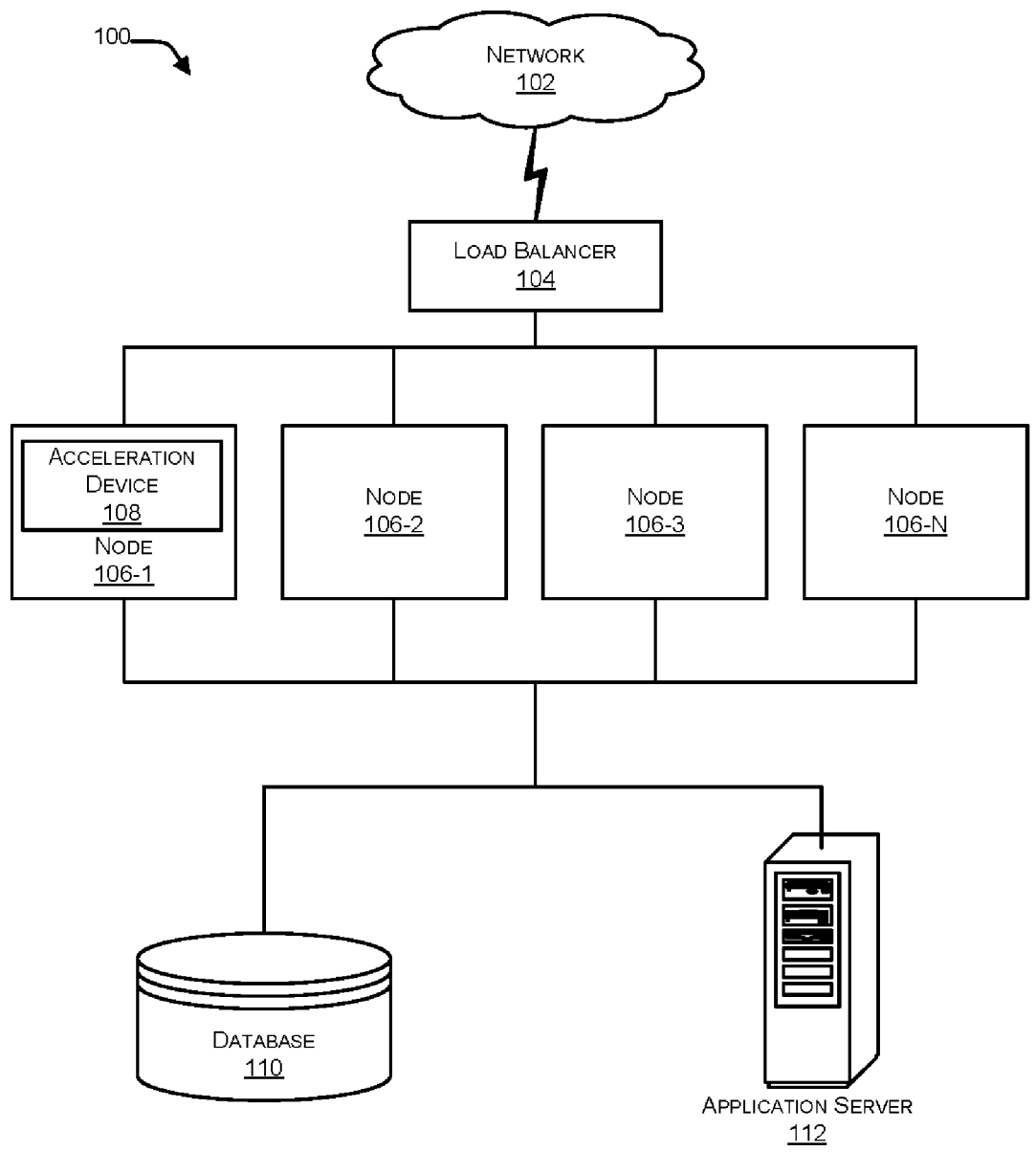
FIG. 1 is a block diagram providing a simplified illustration of a data center in which embodiments of the present invention may be utilized.

Systems and methods are described for providing effective hardware acceleration by performing a combination of string matching and range comparison. According to one embodiment, significant cost savings are achieved by implementing both pattern matching and range comparison functionality within a single hardware acceleration device of a Network Interface Card (NIC), such as a SmartNIC, thereby facilitating the sharing of the hardware acceleration functionality with multiple host systems within the same data center, for example, by the host system on which the SmartNIC is installed.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

According to various embodiments of the present disclosure, an acceleration device of a host device receives an input stream of information including a string and/or an integer range. The input stream or part of the input stream is matched with contents of a hash-based lookup table to identify one or more units of the input stream, which satisfy at least one condition for any or a combination of a string match and a range comparison. The identified one or more units of the input stream are correlated based on set of conditions to form at least one set of correlated units such that the set of conditions define at least one rule related to any of a network policy definition, a packet inspection rule, a database operation command or a format of the input stream. Further, based on the at least one set of correlated units, the acceleration device performs any or a combination of exact string matching and exact range match.

Therefore, those skilled in the art will appreciate that the acceleration device of the present disclosure performs a combination of string matching and range comparison, thereby providing hardware acceleration. Further, according to an implementation, the acceleration device cost-effectively shares the acceleration functionality with various nodes and network security applications of a data center. For example, associating the acceleration device with a Smart-NIC can provide ease of communication with a network interface and a storage interface, and can also facilitate sharing a the acceleration device with hosts in a data center.

FIG. 1 is a block diagram providing a simplified illustration of a data center 100 in which embodiments of the present invention may be utilized. According to an embodiment, a technique for providing effective hardware acceleration is disclosed, which involves performing string matching and/or range comparison by using an acceleration device 108 that may be implemented in at least one node 106-1 selected from nodes 106-1, 106-2 . . . 106-N (which may be collectively referred to herein as nodes 106 and may be individually referred to herein as node 106), forming part of data center 100. Nodes 106 can include host devices that may benefit from hardware acceleration of various tasks, such as pattern matching, regular expression matching and range comparison. In an implementation, acceleration device 108 can be made available for use by other host devices within data center 100 to perform on behalf of one or more of other host devices any or a combination of range comparison and pattern matching for intrusion prevention, firewall policy search, database applications and the like.

In an embodiment, external devices can connect to data center 100 through a network 102, which can be wireless network, wired network or a combination thereof that can be implemented as one of the different types of networks, such as Intranet, Local Area Network (LAN), Wide Area Network (WAN), Internet, and the like. Further, network 102 can either be a dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Further, data center can include a load balancer 104 operatively coupled to nodes 106 for efficient distribution of workloads across multiple computing resources of a private network. Further, nodes 106 can be operatively coupled to a database 110 and an application server 112 to provide application services to users (e.g., people or other applications).

According to an embodiment, acceleration device 108 can receive an input stream of information, which can include any or a combination of a string or an integer range. For example, the input stream can include a packet stream that can be received from a network interface or a data stream that can be received from a storage interface. Acceleration device 108 can generate contents of a hash-based lookup table based on conditions of at least one rule related to any of a network policy definition, a packet inspection rule, a database operation command, a format of the input stream and the like. It will be appreciated that each entry of the hash based lookup table can correspond to a format of the input steam and can include a value of the integer range or the string. Further, acceleration device 108 can match the input stream or at least a part or parts of the input stream with contents of a hash-based lookup table to identify one or more units of the input stream satisfying at least one condition of a string match condition and/or a range comparison.

In an implementation, the input stream pertaining to a string can be passed through a set of filters (e.g., bloom filters arranged in a cascaded manner) to identify one or more fixed length character strings within the input stream, which can then be matched with the contents of the hash based lookup table to identify the one or more units of the input stream that satisfy the at least one condition. Conversely, when the input stream pertains to an integer range, acceleration device 108 can apply a mask to the input stream to match the input stream or at least a part or parts of the input stream with the contents of the hash-based lookup table. Further, when length of the input stream is less than a pre-defined threshold, the input stream can be passed through a symbol content address memory to identify the one or more units of the input stream, which satisfy at least one condition. In an embodiment, matching can be performed in multiple levels such that each level of the multiple levels matches a specific length of the input stream or at least a part or parts of the input stream with an entry of the hash-based lookup table.

In an embodiment, acceleration device 108 can correlate the identified one or more units based on a set of conditions to form at least one set of correlated units. The set of conditions can be defined for at least one rule related to any of a network policy definition, a packet inspection rule, a database operation command, a format of the input stream and the like. The at least one set of correlated units can be transmitted to other nodes 106 or host devices of data center 100, for use by other nodes 106 within the data center 100 to perform any or a combination of intrusion prevention pattern matching, firewall policy search pattern matching, pattern matching for applications and the like on behalf of one or more of the other host devices 108. In an embodiment, any or a combination of exact string matching and exact range matching can then be performed by acceleration device 108 based on the at least one set of correlated units.

Figure 2A:
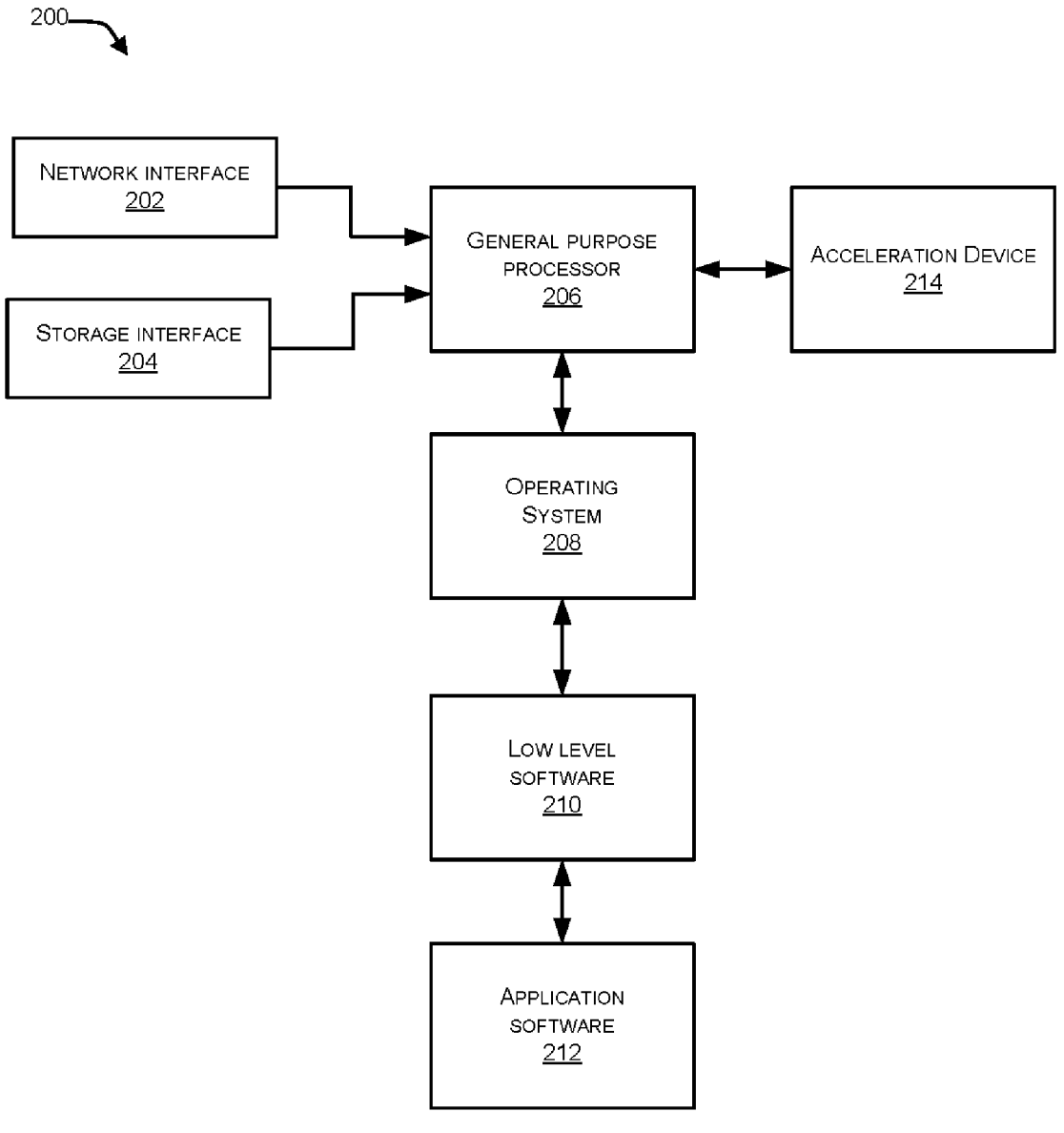
FIG. 2A is a block diagram illustrating an exemplary architecture of a host system including an acceleration device in accordance with an embodiment of the present invention.

FIG. 2A is a block diagram illustrating an exemplary architecture of a host system 200 including an acceleration device in accordance with an embodiment of the present invention. In the context of present example, the host system 200 can include a network interface 202 that can act as a point of interconnection between the host device 200 and a network. Network interface 202 can have some form of network address including a node identifier and a port number or can be a unique node identifier. Network interface 202 can be operatively coupled to a general purpose processor 206 for running the compute-intensive applications at issue.

Further, the host system 200 can include a storage interface 204, the type and form of which can be dependent on many factors or criteria. Storage interface 204 can be operatively coupled with general purpose processors 206 for controlling any storage decision or requirements for various applications of the host system 200. For example, storage of file data or block data, performance, operating system, throughput, flexibility, scalability, data mobility, reliability and the like can be controlled using storage interface 204.

The host system 200 can further include an operating system 208 for managing various computer resources and interfaces, which can include general purpose processor 206, storage interface 204, and network interface 202 so that the resources can be correctly and fairly used. Further, operating system 208 can be an interface that enables a user to interact with general purpose processor 206 of the host system 200. Further, operating system 208 of the host system 200 can run a program or group of programs designed for end users. These programs can be divided into two classes: low level software 210 and application software 212. While low level software 210 includes low-level programs that interact with computing devices at a basic level, application software 212 resides above system software and includes applications such as database programs, network security functionality and the like.

According to an embodiment, the host system 200 can further include an acceleration device 214 for hardware accelerating certain compute-intensive function, such as those involving pattern matching and/or policy searching. When the host system 200 receives an input stream of instructions, either from network interface 202 or from storage interface 204, for performing string matching and/or range comparison, acceleration device 214 can be used for providing effective hardware acceleration by performing string matching and range comparison on the received input stream using a hash based look up table so that suitable output can be provided to general purpose processor 206. In this manner, acceleration device 214 decreases latency and increases throughput of general purpose processor 206 of the host system 200. Those skilled in the art will appreciate that acceleration device can be used to perform various functionalities such as intrusion prevention pattern matching, firewall policy search pattern matching, applications' pattern matching and the like.

Figure 2B:
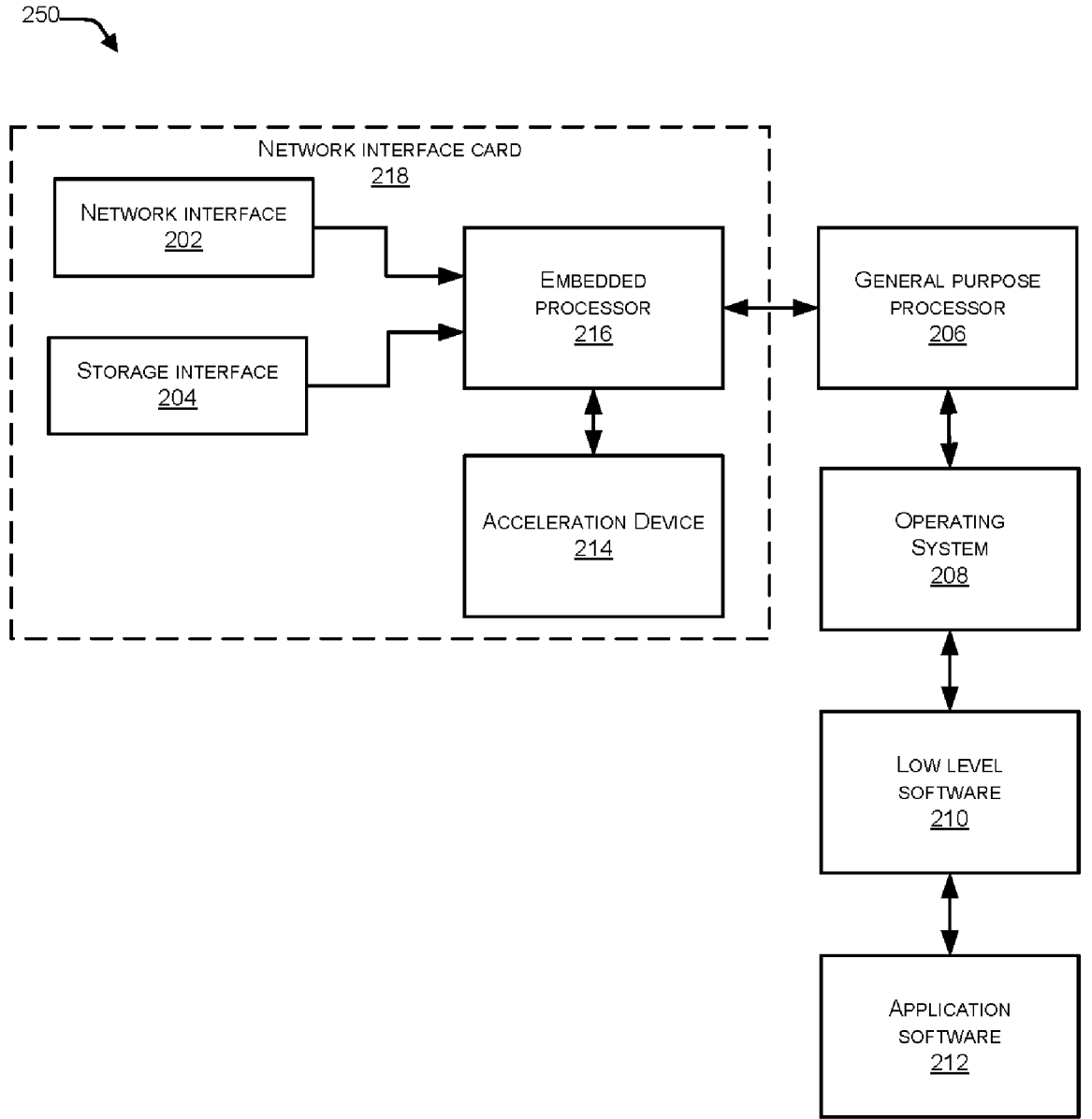
FIG. 2B is a block diagram illustrating a network interface card (NIC) including an acceleration device in accordance with an embodiment of the present invention.

FIG. 2B is a block diagram 250 illustrating a network interface card (NIC) 218 including an acceleration device 214 in accordance with an embodiment of the present invention. In the context of the present example, to perform string matching and range comparison using acceleration device 214, a host system can be operatively coupled with a NIC 218. According to an embodiment, embedded processor 216 of NIC 218 can be operatively coupled to general purpose processor 206 of the host system. NIC 218 can further include network interface 202 and storage interface 204. Further, NIC 218 can include an acceleration device 214 operatively coupled with embedded processor 216. Acceleration device 214 can be configured to process an input stream of data for providing effective hardware acceleration, which may involve performing one or both of string matching and range comparison with a common set of hardware resources. Further, the host system can include operating system 208, low level software 210 and application software 212. In an embodiment, NIC 218 can be in the form of a discrete device that can be interfaced or operatively coupled with general purpose processor 206 of the host system for providing effective hardware acceleration, which involves performing string matching and/or range comparison. Further, acceleration device 214 of NIC 218 can be utilized for pattern matching by plurality of other host systems or network nodes operatively coupled with the NIC through the host system, without awareness of physical location of the NIC.

FIG. 3 illustrates examples 300 of a packet inspection rule 302, a firewall policy 304 and an SQL command 306 for which pattern matching and range comparison hardware acceleration would be helpful. The example packet inspection rule 302 pertains to inspection of packets to determine an input stream of data packets that have content type as text and/or Hypertext Markup Language (HTML). The example firewall policy 304 is defined to match all address from network 192.168.0.0/24. The example standardized query language (SQL) command 306 is defined to determine all results from 'my table' that have 'ename' as 'shoe' and has a 'unit price' between 100 and 1000. In an implementation, examples 302, 304 and 306 illustrate the type of compute-intensive pattern matching and policy searching that can be accelerated by an acceleration device described herein.

FIG. 4 is a block diagram illustrating components of an acceleration device 400 in accordance with an embodiment of the present invention. In the context of the present example, an input stream of information can be received at block 402 that pertains to a bloom filter of acceleration device 400. When the input stream pertains to a string, bloom filter 402 can facilitate determining a length of the input stream, which is further explained with reference to FIG. 5. However, when the input stream pertains to a range, the bloom filter 402 can be bypassed and the input stream can be directly provided to cascaded range or string compare block 404. Cascaded range or string compare block 404 can be used for performing range comparison and string matching to identify units of the input stream that satisfy conditions present in a hash-based lookup table, which is further explained with reference to FIGS. 6A-B. In an implementation, when input stream pertains to a string with a length less that a pre-defined threshold, the input stream can be passed through a symbol content address memory 406 to identify the units that satisfy conditions from multiple available conditions present in the hash-based look-up table.

Further, correlation block 408 can correlate the identified units based on a set of conditions defined as a rule related to any of a network policy definition, a packet inspection rule, a database operation command, a format of the input stream and the like. Output of the correlation block 408 is at least one set of correlated units, which can be passed to exact match processors 410 to perform exact string matching and exact range matching.

Figure 5:
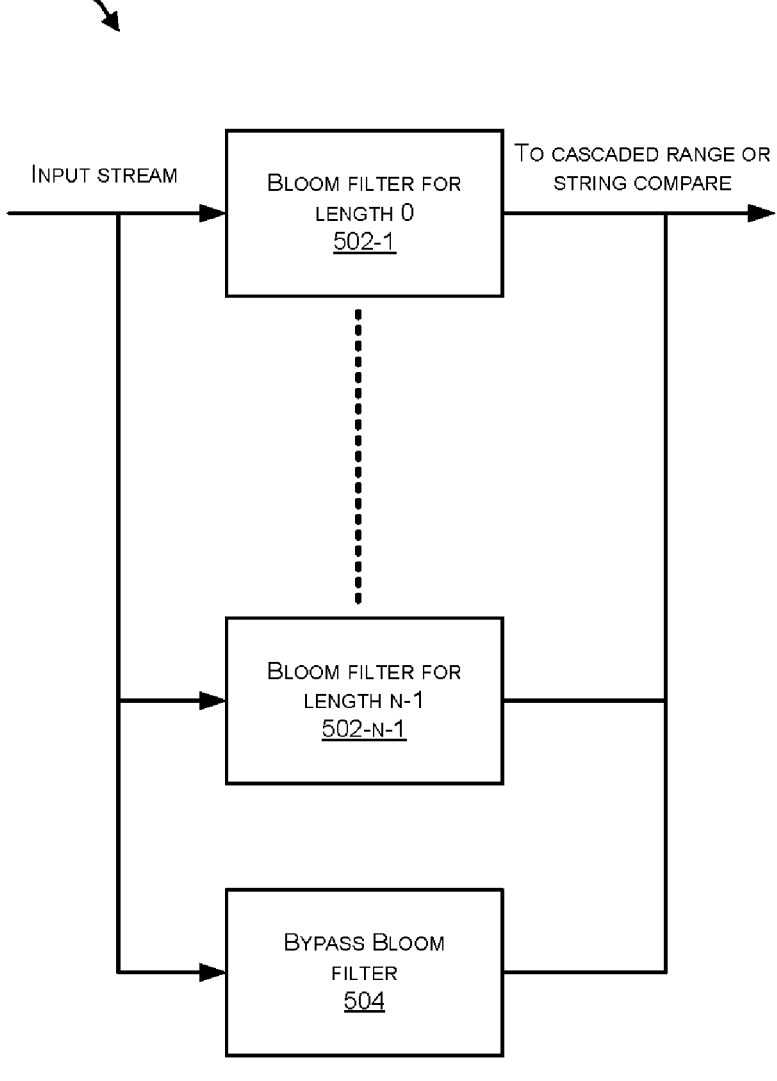
FIG. 5 is a block diagram illustrating implementation of a bloom filter in accordance with an embodiment of the present invention.

FIG. 5 is a block diagram illustrating implementation of a bloom filter architecture 500 in accordance with an embodiment of the present invention. According to an embodiment, bloom filter architecture 500 can include multiple bloom filters 502-1, 502-2 . . . 502-N−1 (which may be collectively referred to herein as bloom filters 502) in an arrangement for example, in parallel to each other. Each of the bloom filters 502 can be specifically selected to determine a particular length of the input stream. The arrangement of bloom filters 502 can thus help in determining a range of length of the input stream. Further, a bypass bloom filter 504 can be arranged in parallel with the arrangement of bloom filters 502 to help bypass the arrangement of bloom filters 502 when the input type pertains to a range. In an embodiment, multiple bloom filters 502 can be arranged in a number of levels in accordance with the length of input to which they apply. For example, bloom filter for length 0 can be arranged at level 1, bloom filter for length 1 can be arranged at level 2 and bloom filter for length N−1 can be arranged at level N.

Figures 6A, 6B:
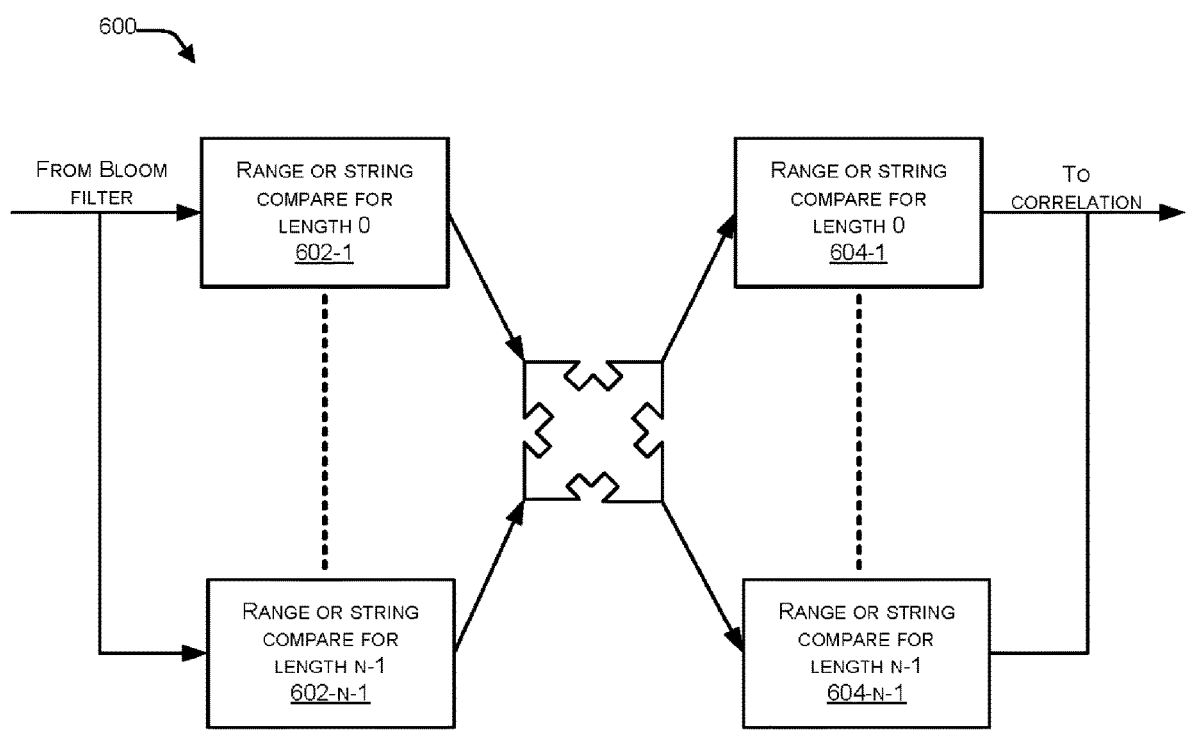
FIG. 6A is a block diagram illustrating implementation of a cascaded range or string compare in accordance with an embodiment of the present invention.
FIG. 6B is an exemplary hash based lookup table in accordance with an embodiment of the present invention.

FIG. 6A is a block diagram illustrating implementation of a cascaded range or string compare in accordance with an embodiment of the present invention. According to an embodiment, range or string compare can include multiple range or string compare blocks arranged in a cascaded manner. For example, first range or string compare blocks 602-1, 602-2 . . . 602-N−1 (which may be collectively referred to herein as first range or string compare blocks 602) can be coupled with multiple second range or string compare blocks 604-1, 604-2 . . . 604-N−1 (which may be collectively referred to herein as second range or string compare blocks 604).

In an embodiment, multiple first range or string compare blocks 602 and multiple second range or string compare blocks 602 can be arranged according to level. For example, range or string compares for length 0 can be arranged at level 1, range or string compares of length 1 can be arranged at level 2 and range or string compares for length N−1 can be arranged at level N. Further, in an implementation one level of output of first range or string compare block 602 can be transmitted to next level of first range or string compare block 602 and/or second range or string compare block 604 as input.

FIG. 6B is an exemplary hash-based lookup table 650 in accordance with an embodiment of the present invention. In an embodiment, for each level, certain length of string or integer can share the same hash lookup table. A table entry can include an integer range or a string, and a type indicating the data structure being integer range or string. Further, a mask can be applied to the input integer data before the hash index calculation. This hash based lookup table can be used to identify the units that satisfy conditions from multiple available conditions such that the identified units can be further correlated based on a set of conditions defined as a rule.

FIG. 7 a flow diagram 700 illustrating a process for string and range matching in accordance with an embodiment of the present invention. In the context of the present example, at block 702, an input stream of information including any or a combination of a string or an integer range can be received by an acceleration device of a host device associated with a data center. Further, at block 704, the input stream or parts thereof ate matched with contents of a hash-based lookup table to identify one or more units of the input stream, which satisfy at least one condition of the plurality of conditions for any or a combination of a string match and a range comparison.

In an aspect, at block 706, the one or more identified units are correlated based on a set of conditions selected from the plurality of conditions to form at least one set of correlated units. The set of conditions can define at least one rule related to any of a network policy definition, a packet inspection rule, a database operation command or a format of the input stream.

In an aspect, at block 708, the acceleration device performs any or a combination of exact string matching and exact range matching based on the at least one set of correlated units.

Figure 8:
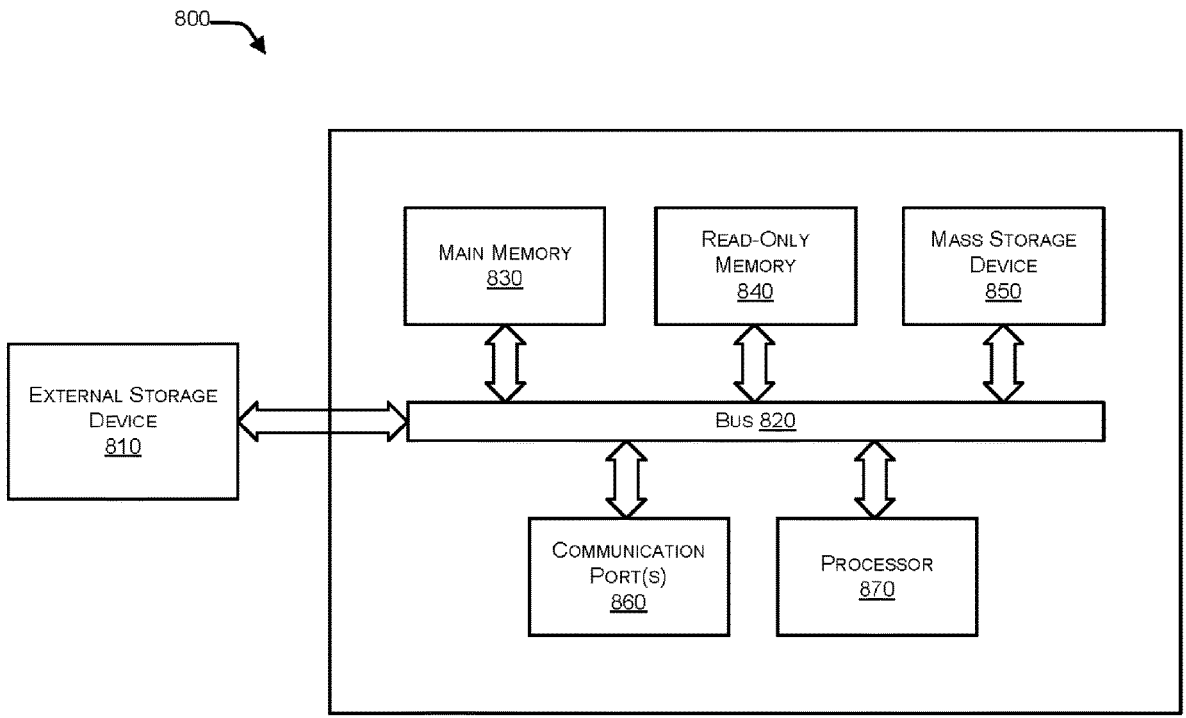
FIG. 8 illustrates an exemplary computer system in which or with which embodiments of the present invention may be utilized.

FIG. 8. illustrates an exemplary computer system 800 in which or with which embodiments of the present invention may be utilized.

As shown in FIG. 8, computer system includes an external storage device 810, a bus 820, a main memory 830, a read only memory 840, a mass storage device 850, a communication port 860, and a processor 870. Computer system 800 may represent some portion of an acceleration device (e.g., acceleration device 108 or 214), a node (e.g., node 106 of FIG. 1) or a host system (e.g., host system 200 of FIG. 2 or host system of FIG. 3).

Those skilled in the art will appreciate that computer system 800 may include more than one processor 870 and communication ports 860. Examples of processor 870 include, but are not limited to, an Intel® Itanium® or Itanium 2 processor(s), or AMD® Opteron® or Athlon MP® processor(s), Motorola® lines of processors, Forti-SOC™ system on a chip processors or other future processors. Processor 870 may include various modules associated with embodiments of the present invention.

Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system connects.

Memory 830 can be Random Access Memory (RAM), or any other dynamic storage device commonly known in the art. Read only memory 840 can be any static storage device(s) e.g., but not limited to, a Programmable Read Only Memory (PROM) chips for storing static information e.g. start-up or BIOS instructions for processor 870.

Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g. a display, keyboard, and a cursor control device, may also be coupled to bus 820 to support direct operator interaction with computer system. Other operator and administrative interfaces can be provided through network connections connected through communication port 860. External storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:

receiving, by a hardware acceleration device of a host device associated with a data center, an input stream of information, said input stream comprising any combination of a string or an integer range, wherein the hardware acceleration device comprises a SmartNIC on a network interface card (NIC) of the host device and is made available for use of a plurality of other host devices within the data center to perform operations on behalf of one or more of the other host devices;

for a string-type input stream, passing the input stream through a set of Bloom filters arranged in a cascaded manner to determine one or more fixed-length characters, and when a length of the input stream is less than a pre-defined threshold, passing the input stream through a symbol content address memory;

matching, by the hardware acceleration device, the input stream or parts thereof with contents of a hash based lookup table in a plurality of levels such that each level matches a specific length of the input stream or a part thereof with an entry of the hash-based lookup table, each entry including a value that is a string or an integer range and a type indicating mask is applied to the input prior to a hash index calculation, to identify one or more units of the input stream, which satisfy at least one condition of a plurality of conditions for any combination of a string match and a range comparison;

correlating, by the hardware acceleration device, the one or more identified units based on a set of conditions selected from the plurality of conditions to form at least one set of correlated units, wherein the set of conditions define at least one rule related to any of a network policy definition, a packet inspection rule, a database operation command or a format of the input stream; and performing, by the at least one set of correlated units any or a combination of exact string matching and exact range matching.

2. The method of claim 1, wherein when a length of said input stream is less than a pre-defined threshold, the input stream is passed through a symbol content address memory to identify the one or more units of the input stream, which satisfy at least one condition.

3. The method of claim 1, wherein when the input stream pertains to the string, the method comprises determining one or more fixed length characters from the string so that the one or more fixed length characters are matched with the contents of the hash based lookup table to identify the one or more units of the input stream, which satisfy the at least one condition.

4. The method of claim 3, wherein the input stream pertaining to the string is passed through a set of filters arranged in a cascaded manner to determine the one or more fixed length characters from the string.

5. The method of claim 1, wherein the acceleration device generates contents of the hash based lookup table based the one or more conditions of the at least one rule.

6. The method of claim 1, wherein the input stream pertains to any or a combination of a packet stream from a network interface and a data stream from a storage interface.

7. The method of claim 1, wherein the acceleration device transmits the at least one set of correlated units to one or more other host devices of the data center.

8. The method of claim 1, wherein when the input stream pertains to the integer range, a mask is applied to the input stream to match the input stream or parts thereof with the contents of the hash based lookup table.

9. The method of claim 1, wherein the step of matching is performed in plurality of levels such that each level of the plurality of levels matches a specific length of input stream or part thereof with an entry of the hash based lookup table.

10. The method of claim 9, each entry of the hash based lookup table corresponds to a format of the input steam and includes a value of the integer range or the string.

11. The method of claim 1, wherein the acceleration device provides hardware acceleration to the one or more other host devices within the data center that each include slower speed capability to that performed by the acceleration device.

12. A non-transitory computer-readable storage medium embodying a set of instructions, which when executed by one or more processors of an acceleration device of a host device associated with a data center, causes the one or more processors to perform a method comprising:

receiving, by a hardware acceleration device of a host device associated with a data center, an input stream of information, said input stream comprising any combination of a string or an integer range, wherein the hardware acceleration device comprises a SmartNIC on a network interface card (NIC) of the host device and is made available for use of a plurality of other host devices within the data center to perform operations on behalf of one or more of the other host devices;

for a string-type input stream, passing the input stream through a set of Bloom filters arranged in a cascaded manner to determine one or more fixed-length characters, and when a length of the input stream is less than a pre-defined threshold, passing the input stream through a symbol content address memory;

matching, by the hardware acceleration device, the input stream or parts thereof with contents of a hash based lookup table in a plurality of levels such that each level matches a specific length of the input stream or a part thereof with an entry of the hash-based lookup table, each entry including a value that is a string or an integer range and a type indicating mask is applied to the input prior to a hash index calculation, to identify one or more units of the input stream, which satisfy at least one condition of a plurality of conditions for any combination of a string match and a range comparison;

correlating, by the hardware acceleration device, the one or more identified units based on a set of conditions selected from the plurality of conditions to form at least one set of correlated units, wherein the set of conditions define at least one rule related to any of a network policy definition, a packet inspection rule, a database operation command or a format of the input stream; and performing, by the at least one set of correlated units any or a combination of exact string matching and exact range matching.

13. The non-transitory computer-readable storage medium of claim 12, wherein when a length of said input stream is less than a pre-defined threshold, the input stream is passed through a symbol content address memory to identify the one or more units of the input stream, which satisfy at least one condition.

14. The non-transitory computer-readable storage medium of claim 12, wherein when the input stream pertains to the string, the method comprises determining one or more fixed length characters from the string so that the one or more fixed length characters are matched with the contents of the hash based lookup table to identify the one or more units of the input stream, which satisfy the at least one condition.

15. The non-transitory computer-readable storage medium of claim 14, wherein the input stream pertaining to the string is passed through a set of filters arranged in a cascaded manner to determine the one or more fixed length characters from the string.

16. The non-transitory computer-readable storage medium of claim 12, wherein the acceleration device generates contents of the hash based lookup table based the one or more conditions of the at least one rule.

17. The non-transitory computer-readable storage medium of claim 12, wherein the input stream pertains to any or a combination of a packet stream from a network interface and a data stream from a storage interface.

18. The non-transitory computer-readable storage medium of claim 12, wherein when the input stream pertains to the integer range, a mask is applied to the input stream to match the input stream or parts thereof with the contents of the hash based lookup table.

19. A non-transitory computer-readable storage medium embodying a set of instructions, which when executed by one or more processors of a network interface card (NIC) of a network node of a plurality of network nodes within a data center, causes the one or more processors to perform a method comprising:

receiving, by a hardware acceleration device of a host device associated with a data center, an input stream of information, said input stream comprising any combination of a string or an integer range, wherein the hardware acceleration device comprises a SmartNIC on a network interface card (NIC) of the host device and is made available for use of a plurality of other host devices within the data center to perform operations on behalf of one or more of the other host devices;

for a string-type input stream, passing the input stream through a set of Bloom filters arranged in a cascaded manner to determine one or more fixed-length characters, and when a length of the input stream is less than a pre-defined threshold, passing the input stream through a symbol content address memory;

matching, by the hardware acceleration device, the input stream or parts thereof with contents of a hash based lookup table in a plurality of levels such that each level matches a specific length of the input stream or a part thereof with an entry of the hash-based lookup table, each entry including a value that is a string or an integer range and a type indicating mask is applied to the input prior to a hash index calculation, to identify one or more units of the input stream, which satisfy at least one condition of a plurality of conditions for any combination of a string match and a range comparison;

correlating, by the hardware acceleration device, the one or more identified units based on a set of conditions selected from the plurality of conditions to form at least one set of correlated units, wherein the set of conditions define at least one rule related to any of a network policy definition, a packet inspection rule, a database operation command or a format of the input stream; and performing, by the at least one set of correlated units any or a combination of exact string matching and exact range matching.

20. The non-transitory computer-readable storage medium of claim 19, wherein the NIC is utilized for pattern matching by one or more other of the plurality of network nodes.

\* \* \* \* \*